US010744588B2

(12) United States Patent
Morales et al.

(10) Patent No.: US 10,744,588 B2
(45) Date of Patent: Aug. 18, 2020

(54) METHOD OF WELDING A NICKEL STRENGTH LUG WITH A BRONZE CONNECTING PIN AND A BRASS CONTACT RING IN AN ACCELEROMETER SENSOR

(71) Applicants: CONTINENTAL AUTOMOTIVE FRANCE, Toulouse (FR); CONTINENTAL AUTOMOTIVE GmbH, Hannover (DE)

(72) Inventors: Thierry Morales, Garidech (FR); Jeroen Van-Est, Montgiscard (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 532 days.

(21) Appl. No.: 15/488,754

(22) Filed: Apr. 17, 2017

(65) Prior Publication Data

US 2017/0312847 A1 Nov. 2, 2017

(30) Foreign Application Priority Data

Apr. 29, 2016 (FR) .................................... 16 53889

(51) Int. Cl.
*B23K 11/20* (2006.01)
*B23K 11/11* (2006.01)
(Continued)

(52) U.S. Cl.
CPC ............... *B23K 11/20* (2013.01); *B23K 11/11* (2013.01); *B23K 11/18* (2013.01); *B23K 11/34* (2013.01);
(Continued)

(58) Field of Classification Search
CPC .... B23K 11/20; B23K 35/226; B23K 35/007; B23K 35/3033; B23K 11/11; B23K 11/34; B23K 2103/18; B23K 9/0026
See application file for complete search history.

(56) References Cited

U.S. PATENT DOCUMENTS

2007/0228888 A1 10/2007 Satou et al.
2012/0324983 A1 12/2012 Aoi
(Continued)

FOREIGN PATENT DOCUMENTS

CN 102922134 2/2013
CN 103128445 6/2013
(Continued)

OTHER PUBLICATIONS

FR Search Report, dated Aug. 25, 2016, from corresponding FR application.

*Primary Examiner* — Geoffrey S Evans
(74) *Attorney, Agent, or Firm* — Young & Thompson

(57) ABSTRACT

The present invention consists in a method of welding a nickel strength lug with a bronze connecting pin and a brass contact ring in an accelerometer sensor, the strength lug being interleaved between the connecting pin and the contact ring, the welding being effected electrically with the strength lug pressed simultaneously against the connecting pin and the contact ring. Before welding, the strength lug undergoes deformation of its external surface at least on each of two portions of the surface respectively facing the connecting pin and the contact ring, the surface deformation creating on each of the portions asperities intended to come into local contact with the connecting pin and the contact ring, respectively.

19 Claims, 4 Drawing Sheets

(51) Int. Cl.
*B23K 11/34* (2006.01)
*B23K 35/30* (2006.01)
*G01P 15/09* (2006.01)
*G01P 1/02* (2006.01)
*B23K 35/00* (2006.01)
*B23K 35/22* (2006.01)
*B23K 11/18* (2006.01)
*B23K 103/08* (2006.01)
*B23K 103/18* (2006.01)
*B23K 101/38* (2006.01)

(52) U.S. Cl.
CPC .......... *B23K 35/004* (2013.01); *B23K 35/007* (2013.01); *B23K 35/226* (2013.01); *B23K 35/3033* (2013.01); *G01P 1/023* (2013.01); *G01P 15/0907* (2013.01); *B23K 2101/38* (2018.08); *B23K 2103/08* (2018.08); *B23K 2103/18* (2018.08); *B23K 2103/26* (2018.08)

(56) References Cited

U.S. PATENT DOCUMENTS

2016/0003864 A1 1/2016 Sonderegger et al.
2016/0008916 A1* 1/2016 Yoshioka ......... H01H 33/66207
428/615

FOREIGN PATENT DOCUMENTS

| CN | 103706908 | 4/2014 |
| CN | 104400236 | 3/2015 |
| CN | 104969078 | 10/2015 |
| EP | 0 662 377 A1 | 7/1995 |
| EP | 1 811 566 | 7/2007 |
| FR | 2 860 075 A1 | 3/2005 |
| JP | 2004/251792 A | 9/2004 |

* cited by examiner

METHOD OF WELDING A NICKEL STRENGTH LUG WITH A BRONZE CONNECTING PIN AND A BRASS CONTACT RING IN AN ACCELEROMETER SENSOR

FIELD OF THE INVENTION

The present invention concerns a method of welding a nickel strength lug with a bronze connecting pin and a brass contact ring in an accelerometer sensor. The welding is effected with the strength lug interleaved between the connecting pin and the contact ring. The welding is effected electrically with the strength lug pressed simultaneously against the connecting pin and the contact ring.

BACKGROUND OF THE INVENTION

As shown in FIG. 1, in the conventional way an accelerometer sensor 8 of this kind includes an assembled head 9 forming the principal body of the sensor 8.

An assembled head 9 includes a barrel including a central bore 10 receiving a fixing element intended to fasten the accelerometer sensor 8 against a support element, for example an internal combustion engine cylinder block in the case of a knocking sensor. It is known to mold a plastic material coating 11 around an external wall of the assembled head 9 partly coating the assembled head 9.

Moreover, it is known that the sensor 8 includes piezoelectric members, one end of each member supporting an inertia mass. The members are accommodated in a cavity between the coating 11 and the assembled head 9.

In one embodiment of the piezoelectric members and their housing the cavity includes a support flange 13 formed by a portion of the external wall of the barrel projecting radially from the assembled head 9.

Said flange supports a piezoelectric member 12 surrounded by contact rings 3 serving as electrodes, a seismic mass 14 and a nut 15, all these components forming a stack.

At least one electrical connection pin 2 connected to each of the contact rings 3 extends out of the accelerometer sensor 8 via a protecting bush 16 itself molded into a portion of the coating 11 forming an arm.

Each connecting pin 2 is connected to a contact ring 3 by a strength lug 1, said strength lug 1 being electrically welded to the contact ring 3 and to the connecting pin 2. This is shown in FIG. 2 for a substantially cylindrical strength lug 1 interleaved between a connecting pin 2 and a contact ring 3 that are substantially plane, the contact ring 3 being the bottom element of these three elements.

The strength lugs 1 used in an accelerometer sensor of this kind have previously been made of copper, advantageously tinned copper. Copper is a technical facilitator of welding between the components of the contact ring 3 and the connecting pin 2, which consist of brass in the case of the contact ring 3 and bronze in the case of the connecting ring 2.

However, the disadvantage of using copper, advantageously tinned copper, as a component of a strength lug 1 is its lack of mechanical strength, notably the deterioration of its mechanical strength with a succession of heat cycles, the strength lugs being exposed to high temperature values.

It has therefore been proposed to replace copper with nickel for a strength lug 1. The position of the substantially cylindrical nickel strength lug 1 before welding is shown in FIG. 2.

This material is less suitable for welding, however. Electrically welding a nickel element such as a strength lug 1 of an accelerometer sensor produces flash, splashes 6 of molten material and wear of the electrodes. Nickel softens relatively little during welding. It also penetrates into the bronze of the other element, namely the connecting pin 2, forming a part 5 of the strength lug 1 melted into the connecting pin 2.

FIG. 3 shows the arrangement from FIG. 2 after welding. A portion of the strength lug 1 has melted into the electrical pin with too large a fused area 5. Similarly, the splashes 6 of molten nickel have reached the contact ring 3.

Nickel is electrically welded at a higher current than copper, for example toward 4 kA instead of 2.4 kA. The different melting points of the materials, namely nickel, bronze and brass, make the welding process difficult to control and also generate a final weld of poor quality. Thus the homogeneity of the weld is no longer guaranteed. Moreover, short-circuits can occur during the welding process.

For example, when the brass contact ring 3 is the bottom part of the three parts comprising the contact ring 3, the strength lug 1 and the electrical connection pin 2, the surface of the contact ring 3 facing the connecting pin 2 is held at a distance from the pin 2 by the strength lug 1 and receives splashes 6 of nickel from the strength lug 1. Moreover, the nickel of the strength lug 1 and consequently the strength lug 1 dig into the bronze of the electrical connection pin 2.

The problem at the base of the invention is to be able to weld reproducibly and efficiently a nickel strength lug with a bronze connecting pin and a brass contact ring in an accelerometer sensor, the strength lug being interleaved between the pin and the contact ring.

SUMMARY OF THE INVENTION

To this end, the present invention concerns a method of welding a nickel strength lug with a bronze connecting pin and a brass contact ring in an accelerometer sensor, the strength lug being interleaved between the connecting pin and the contact ring, the welding being effected electrically with the strength lug pressed simultaneously against the connecting pin and the contact ring, noteworthy in that, before welding, the strength lug undergoes deformation of its external surface at least on each of two portions of the surface respectively facing the connecting pin and the contact ring, the surface deformation creating on each of said portions asperities intended to come into local contact with the connecting pin and the contact ring, respectively.

The technical effect is to obtain greater control of the fusion between the different materials, namely nickel, bronze and brass, for example with less penetration of the nickel of the strength lug into the bronze of the connecting pin.

According to the invention, there is obtained the creation of a plurality of points limited of contact between the materials to reduce the value of the current during electric welding and to prevent excessive fusing of the materials. With a symmetrical asperity profile, the digging of the strength lug into the connecting pin is therefore controlled, i.e. reduced and better distributed.

At the start of welding, the portions of the strength lug that have received a surface treatment contact the connecting pin and the contact ring only via their projecting asperities and therefore offer a more limited surface area during welding than without surface treatment. These projecting asperities therefore require a lower electrical current to melt and to fuse with the other metals in contact, that fusing being limited compared to the fusing obtained in the prior art. The reduction of the current can be as high as 15 to 30% or even higher.

Using a lower current for the welding makes it possible, on the one hand, not to fuse a sizable part of the nickel strength lug with the bronze connecting pin and, on the other hand, to reduce the splashing of molten material. Using a lower current generates less sparks and splashes of material during welding and increases the service life of the electrodes, which can be doubled, at the same time as reducing the frequency of sharpening the electrodes.

The welding temperature can also be reduced, which will make it possible to load the electrodes less and to give them a better service life.

Before welding, the strength lug is advantageously pressed simultaneously against the connecting pin and the contact ring, the pressure causing the asperities of the portions of the surface of the strength lug to dig into the connecting pin and the contact ring, respectively. Limited contacts are therefore obtained before welding to reduce the quantity of material to be melted for the welding.

The surface deformation is advantageously obtained by knurling or striation. The knurling or striation makes it possible to preserve a profile with regular and repetitive asperities that improve the homogeneity of the welding.

The asperities are advantageously in the form of spikes carried by the respective portions of the surface of the strength lug locally contacting the connecting pin and the contact ring. Those portions can be obtained when knurling produces a plurality of series of striations at an angle to one another, for example.

The asperities are advantageously in the form of series of separate and parallel striations carried by the portions of the surface of the strength lug, the striations having peaks locally contacting the connecting pin and the contact ring, respectively.

The series of striations advantageously extend transversely on the strength lug. This makes it possible to preserve localized contact on the other series of striations after a series of striations has already been melted.

A die stamping operation to flatten the strength lug is advantageously performed before the knurling or striation. This makes it possible to obtain beforehand a flattening of the strength lug guaranteeing the use of a lower pressure to cause the strength lug to dig in. Now, the vertical force exerted on the assembly to be welded and too high an electric current for the welding causes a large fused area with splashing of molten material and difficulty in welding. The present invention makes it possible to reduce the vertical force by advantageously effecting a flattening before welding of the strength lug. This preliminary flattening, combined with the use of a lower current for welding, because of the presence of the asperities, makes it possible to avoid producing a large fused area and splashing during welding.

Advantageously, the surface deformation is effected by grinding increasing the roughness of the respective surface portions facing the connecting pin and the contact ring. This embodiment is an alternative to knurling and can guarantee the formation of asperities projecting from the respective portions of the strength lug facing the connecting pin or the contact ring.

Advantageously, the strength lug is tinned before welding. Tinning makes it possible to provide protection against corrosion of the strength lug, which was very beneficial for a prior art copper strength lug but may be employed in the context of the present invention to improve the weldability of the nickel strength lug.

The invention also concerns an accelerometer sensor including at least two electrical connection pins connected by a respective strength lug to a respective contact ring, noteworthy in that each strength lug is welded to the respective connecting pin and contact ring by a method of the above kind.

An accelerometer sensor of the above kind produced by welding the strength lugs by a method according to the invention has recognizable characteristics that distinguish it from accelerometer sensors with conventional welding of the strength lugs. It can in fact be seen that there is less fused material between the strength lug and the pin and the fused material is better distributed in an accelerometer sensor according to the present invention than in a prior art sensor.

An accelerometer sensor with nickel strength lugs of the above kind makes it possible to comply with most of the conditions of the specifications concerning its strength, durability and resistance to frequent high thermal loads, which is not the case with prior art tinned copper strength lugs. Using nickel as the base material of the strength lug has caused a problem of difficult and non-reproducible welding that the method according to the present invention has solved.

BRIEF DESCRIPTION OF THE DRAWINGS

Other features, objects and advantages of the present invention will become apparent on reading the following detailed description with reference to the appended drawings provided by way of nonlimiting example and in which.

DETAILED DESCRIPTION OF THE INVENTION

It should be borne in mind that the figures are provided by way of example and are not limiting on the invention. They constitute diagrammatic and theoretical representations intended to facilitate the understanding of the invention and are not necessarily at the scale of practical applications. In particular, the dimensions of the various elements shown are not representative of reality.

Figure 3:
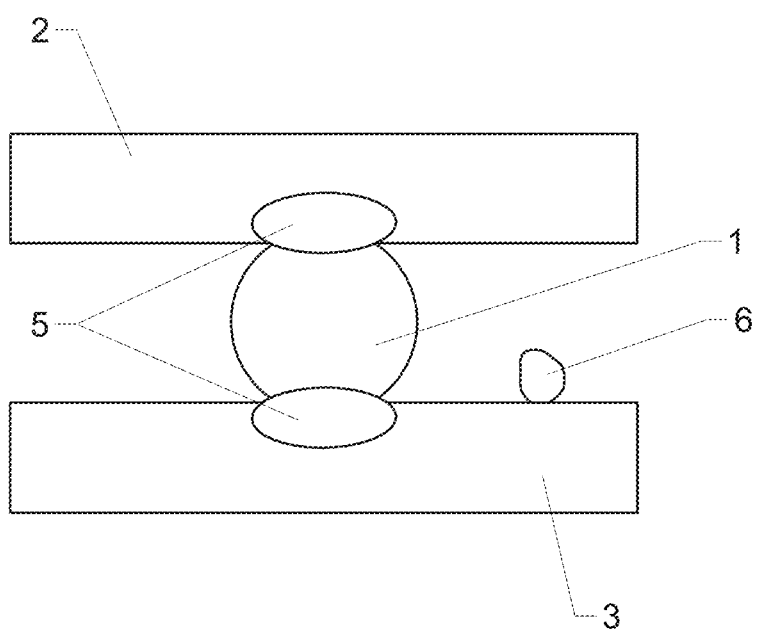
Figure 4:
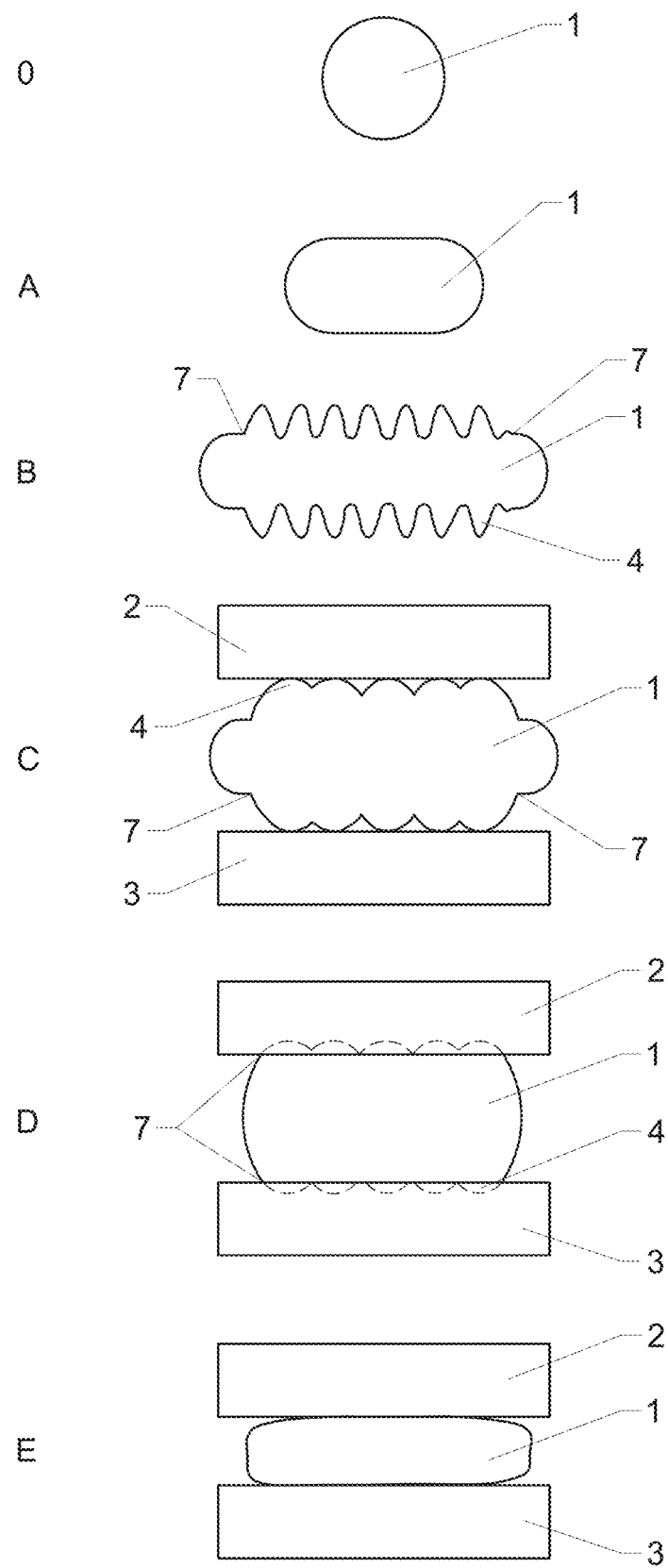
FIG. 4 shows the succession of steps according to a first embodiment of the welding method according to the present invention, the strength lug undergoing a surface treatment by die stamping followed by knurling before welding.

For example, in the figures the strength lug shown is of cylindrical shape, which is not limiting on the invention. In FIG. 3, the fused zones can have a shape other than oval. In FIG. 4, in step B, the deformed shape of the strength lug has been shown enlarged relative to its non-deformed shape to show the asperities better. Those asperities can also take shapes other than those shown. The final shape of the strength lug is shown very diagrammatically and may also differ significantly from that shown in step E. The same applies to FIG. 5 where the star-shaped cross section of the strength lug shown is also not limiting on the invention.

Figure 1:
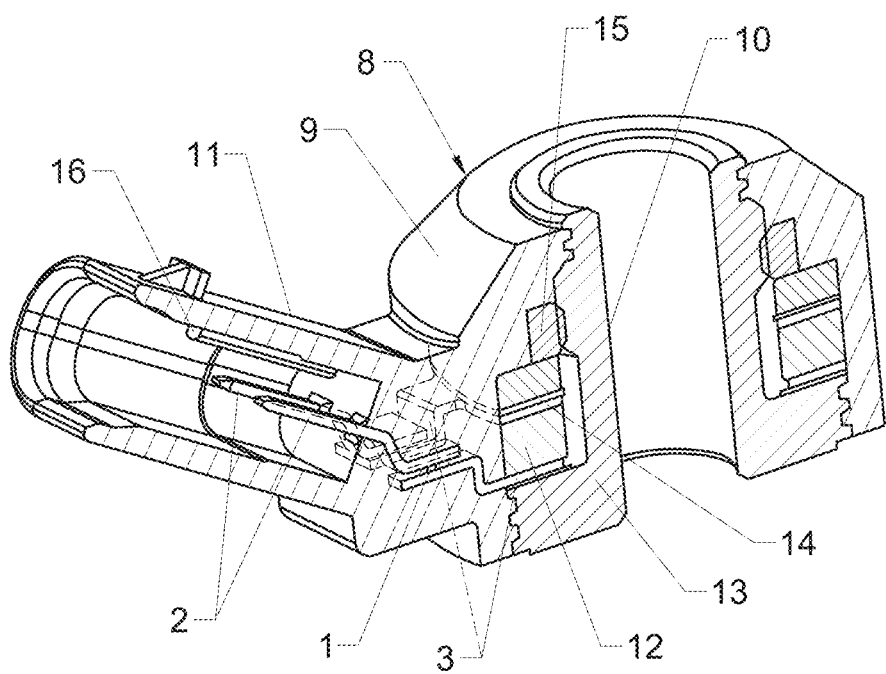
FIG. 1 is a diagrammatic perspective view in half-section of an accelerometer sensor comprising connecting pins welded to respective contact rings by a strength lug, the welding being possible according to a method according to the present invention.
Figure 2:
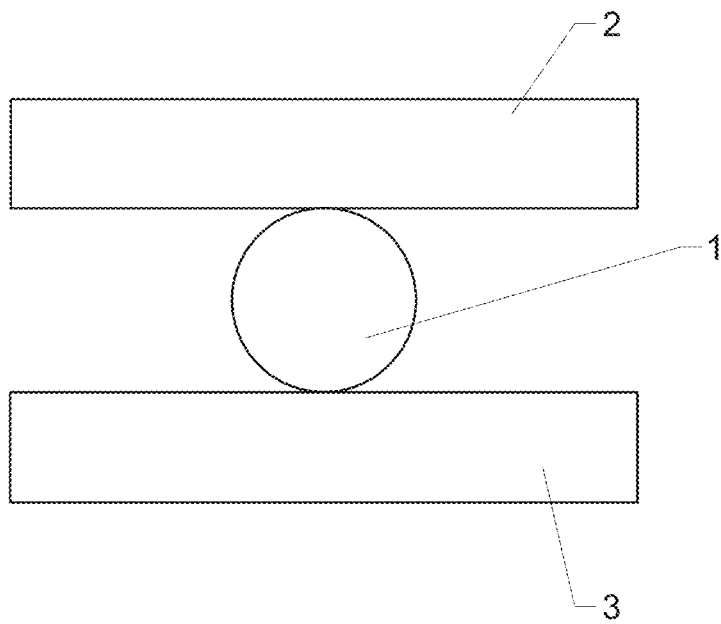
FIGS. 2 and 3 are diagrammatic representations of a section of an assembly comprising a connecting pin, strength lug and contact ring respectively before and after welding by a prior art method.

FIGS. 1 to 3 have already been described in the introductory part of the description of the present patent application.

Figure 5:
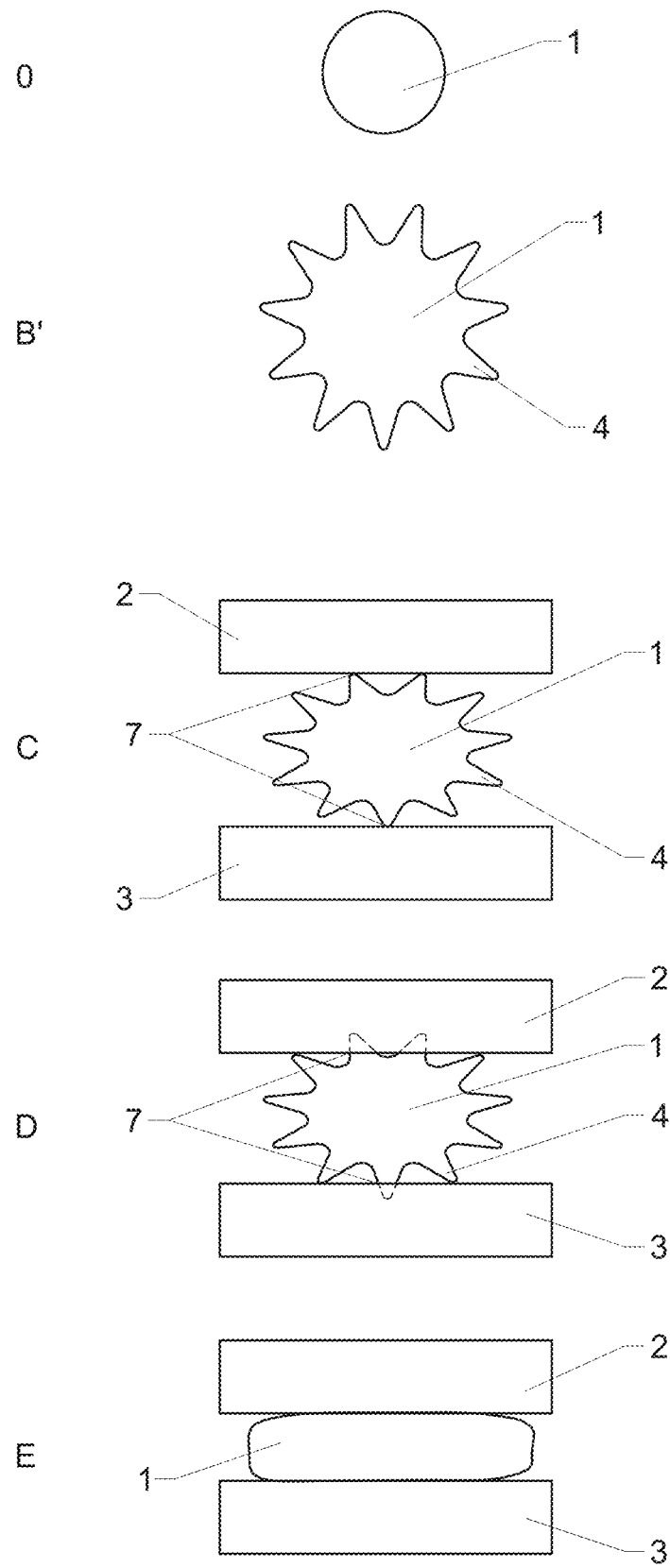
FIG. 5 shows the succession of steps according to a second embodiment of the welding method according to the present invention, the strength lug undergoing a surface treatment by knurling over its entire surface before welding.

Referring to FIGS. 4 and 5, which show two nonlimiting embodiments of the welding method according to the present invention, as well as referring to FIG. 1 for reference numbers not included in FIGS. 4 and 5, for these two embodiments the welding method is applied to a nickel strength lug 1 with a bronze connecting pin 2 and a brass contact ring 3 in an accelerometer 8. The strength lug 1 is interleaved between the connecting pin 2 and the contact ring 3. The welding is effected electrically with the strength lug 1 pressed simultaneously against the connecting pin 2 and the contact ring 3.

In the context of the present invention, what is meant by the welding method does not comprise only the welding step itself but also the steps from preparation of the welding lug 1 to a welding step as such, the welding method according to the invention being broader and comprising more steps than the welding operation itself.

Nickel as the base material of the strength lug 1 has welding parameters, such as its melting point, for example, very different from the parameters of brass or bronze. Too high a welding temperature will create too much melting of the nickel into the bronze and therefore excessive penetration of a part of the strength lug 1 into the connecting pin 2, which is to be avoided.

According to the present invention, before welding, the strength lug 1 undergoes a deformation of its external surface at least on each of the two portions 7 of the surface facing the connecting pin 2 and the contact ring 3, respectively. The surface deformation creates asperities 4 on each of said portions intended to come locally into contact with the connecting pin 2 and the contact ring 3, respectively.

Only one asperity is referenced in FIGS. 4 and 5 for each step of the method, but what is indicated for the reference 4 applies to all the asperities.

By asperities 4 is meant all uneven projections from the deformed surface portion. They can be symmetrical or not, advantageously projecting to the same height from the defined surface portion, although series of different heights can also be used.

It is advantageous to restrict the surface deformation to the respective portions 7 of the external surface directly facing the connecting pin 2 or the contact ring 3. This is shown in FIG. 4.

It is also possible to provide the entire external surface of the strength lug 1 with asperities, the surface deformation then applying to the whole of the external surface, as shown in FIG. 5. For example, this may be required on an external surface of a cylindrical strength lug 1 when the surface deformation is done during rotation of the strength lug 1, for example when the knurling B, B' is effected on a lathe, complete deformation of the external surface being easier to obtain during manufacture than deformation of portions 7 of the external surface of the strength lug 1.

Before welding, the strength lug 1 may be pressed simultaneously against the connecting pin 2 and the contact ring 3, the pressure causing the asperities 4 on the portions 7 of the surface of the strength lug 1 to dig into the connecting pin 2 and the contact ring 3. Nickel is in fact a harder material than bronze or brass and the free ends of the asperities 4 of the portions 7 of the external surface of the strength lug 1 can therefore be pressed against the facing surfaces of the connecting pin 2 and the contact ring 3 and penetrate at least slightly into those two parts. This step is shown under reference C in FIGS. 4 and 5.

As shown in FIGS. 4 and 5, the surface deformation can be effected by knurling B, B' or striation. The knurling B, B' is an operation that consists in producing striations on a surface, said striations possibly crossing, for example at least two series of striations parallel to one another in the same series, the striations of one series being at an angle to the striations of the other series. By striation is meant the creation of series of striations parallel to one another. The knurling B, B' is very suitable for a cylindrical part, this being a shape that a strength lug 1 may have. The knurling B, B' may be done on the strength lug 1 by machining it on a lathe.

As previously mentioned, a plurality of shapes of asperities 4 are possible. For example, the asperities 4 can take the form of spikes carried by the respective portions 7 of the surface of the strength lug 1 locally contacting the connecting pin 2 and the contact ring 3. In another example, the asperities 4 may take the form of series of separate and parallel striations carried by the portions 7 of the surface of the strength lug 1, the striations having peaks locally contacting the connecting pin 2 and the contact ring 3. This is the case when the portions 7 of the external surface of the strength lug 1 have undergone striation.

In this case, it is preferred that the series of striations extend transversely on the strength lug 1.

In FIG. 4, in the first embodiment of the welding method according to the present invention, in the step A, a die stamping step A may be carried out before the knurling step B, B' or the striation step, the die stamping step A starting from a strength lug 1 in step 0 flattening the strength lug 1.

Then, after this die stamping step A, the knurling step B can follow, and then the step C of pressing the strength lug 1 simultaneously against the connecting pin 2 and the contact ring 3. In this step C, the contact ring 3 can be under the strength lug 1, itself under the connecting pin 2, as also shown in FIGS. 1 to 3, but this arrangement can also be reversed.

At the end of this method according to the first embodiment of the present invention, there follows the welding step D and the production of the final welded assembly E consisting of the connecting pin 2, the strength lug 1 and the contact ring 3.

According to the second embodiment of the invention, starting from the starting strength lug 1 referenced in the step 0, there may follow a striation step B' without the strength lug 1 being deformed beforehand.

The striation step B' can be done over the whole of the strength lug 1 but in this second embodiment this is not obligatory. This knurling striation step B' is then followed by the welding step D and the production of the final welded assembly E, the latter two steps D and E being common to both embodiments of the welding method according to the present invention.

The strength lug 1 in its final state in the step E can have been deformed as a result of digging in or being flattened in the two embodiments of the invention. To give an idea of this and without limiting the invention, in the step 0 the strength lug 1, which is advantageously cylindrical, could have a diameter or a thickness between pin 2 and contact ring 3 of 0.5 mm while the strength lug 1 in the final welded assembly E has a diameter or a thickness of only 0.25 mm, i.e. digging in by 0.25 mm. This is not limiting on the invention.

Another possible surface deformation that can be employed in the welding method according to the present invention may be a surface deformation by grinding that increases the roughness of the respective portions 7 of the surface facing the connecting pin 2 and the contact ring 3.

The strength lug 1 can be tinned before welding. Tinning is a surface treatment operation that consists in applying a layer of tin to the strength lug 1, which protects it against corrosion and improves its weldability.

The invention also concerns an accelerometer sensor 8 having at least two electrical connection pins 2 connected by a strength lug 1 to a respective contact ring 3. Each strength lug 1 is welded to the respective connecting pin 2 and to the respective contact ring 3 by a method of this kind.

The present invention makes it possible to reduce the flattening of the strength lug 1 caused by excessive penetration of a part of the strength lug 1 into the connecting pin 2. In fact, with a method according to the present invention the penetration of the strength lug 1 into the connecting pin 2 is reduced at the same time as increasing the welding area through a greater area of bonding of the strength lug 1 with on the one hand the connecting pin 2 and on the other hand the contact ring 3.

The invention claimed is:

1. A method of welding a nickel strength lug (1) with a bronze connecting pin (2) and a brass contact ring (3) in an accelerometer sensor (8), the nickel strength lug (1) being interleaved between the bronze connecting pin (2) and the brass contact ring (3), the method comprising a step of:
   welding, electrically, the nickel strength lug (1) with the bronze connecting pin (2) and the brass contact ring (3), with the nickel strength lug (1) pressed simultaneously against the bronze connecting pin (2) and the brass contact ring (3),
   wherein, before the step of welding, an external surface of the nickel strength lug (1) undergoes surface deformation at least on each of two portions (7) of the external surface that face, respectively, the bronze connecting pin (2) and the brass contact ring (3), the surface deformation creating, on each of said two portions, asperities (4) intended to come into local contact with the bronze connecting pin (2) and the brass contact ring (3), respectively.

2. The method according to claim 1, further comprising:
   before the step of welding, simultaneously pressing the nickel strength lug (1) against the bronze connecting pin (2) and the brass contact ring (3), a pressure of said pressing causing the asperities (4) of the two portions (7) of the external surface of the nickel strength lug (1) to dig into the bronze connecting pin (2) and the brass contact ring (3), respectively.

3. The method according to claim 2, wherein the surface deformation is obtained by either of knurling (B, B') or striation.

4. The method according to claim 2, wherein the surface deformation is effected by grinding in a manner that increases a roughness of the two portions (7) of the external surface respectively facing the bronze connecting pin (2) and the brass contact ring (3).

5. The method according to claim 2, wherein the nickel strength lug (1) is tinned before the step of welding.

6. The method according to claim 1, wherein the surface deformation is obtained by either of knurling (B, B') or striation.

7. The method according to claim 6, wherein the asperities (4) are in form of spikes carried by the two portions (7) of the external surface of the nickel strength lug (1) locally contacting the bronze connecting pin (2) and the brass contact ring (3), respectively.

8. The method according to claim 7, further comprising:
   before the surface deformation is obtained by either of knurling (B, B') or striation, carrying out die stamping (A) to flatten the nickel strength lug (1).

9. The method according to claim 7, wherein the nickel strength lug (1) is tinned before the step of welding.

10. The method according to claim 6, wherein the asperities (4) are in form of a series of separate and parallel striations carried by the two portions (7) of the external surface of the nickel strength lug (1), the separate and parallel striations having peaks locally contacting the bronze connecting pin (2) and the brass contact ring (3), respectively.

11. The method according to claim 10, further comprising:
    before the surface deformation is obtained by either of knurling (B, B') or striation, carrying out die stamping (A) to flatten the nickel strength lug (1).

12. The method according to claim 10, wherein the nickel strength lug (1) is tinned before the step of welding.

13. The method according to claim 10, wherein the series of separate and parallel striations extend transversely on the nickel strength lug (1).

14. The method according to claim 13, further comprising:
    before the surface deformation is obtained by either of knurling (B, B') or striation, carrying out die stamping (A) to flatten the nickel strength lug (1).

15. The method according to claim 13, wherein the nickel strength lug (1) is tinned before the step of welding.

16. The method according to claim 6, further comprising:
    before the surface deformation is obtained by either of knurling (B, B') or striation, carrying out die stamping (A) to flatten the nickel strength lug (1).

17. The method according to claim 6, wherein the nickel strength lug (1) is tinned before the step of welding.

18. The method according to claim 1, wherein the surface deformation is effected by grinding in a manner that increases a roughness of the two portions (7) of the external surface respectively facing the bronze connecting pin (2) and the brass contact ring (3).

19. The method according to claim 1, wherein the nickel strength lug (1) is tinned before the step of welding.

* * * * *